US012615341B2

(12) United States Patent
Afrasiabi

(10) Patent No.: US 12,615,341 B2
(45) Date of Patent: *Apr. 28, 2026

(54) DIGITAL OVERLAY

(71) Applicant: CICERO NOW LLC, Newport Beach, CA (US)

(72) Inventor: Peter Afrasiabi, Laguna Beach, CA (US)

(73) Assignee: CICERO NOW LLC, Newport Beach, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 18/195,494

(22) Filed: May 10, 2023

(65) Prior Publication Data

US 2024/0333865 A1      Oct. 3, 2024

Related U.S. Application Data

(63) Continuation of application No. 17/685,169, filed on Mar. 2, 2022, now Pat. No. 11,689,688.

(60) Provisional application No. 63/156,277, filed on Mar. 3, 2021.

(51) Int. Cl.
| | |
|---|---|
| *H04N 5/272* | (2006.01) |
| *H04L 65/401* | (2022.01) |
| *H04L 65/403* | (2022.01) |
| *H04N 7/14* | (2006.01) |

(52) U.S. Cl.
CPC ......... *H04N 5/272* (2013.01); *H04L 65/4015* (2013.01); *H04L 65/403* (2013.01); *H04N 7/144* (2013.01)

(58) Field of Classification Search
CPC ........ H04N 5/272; H04N 7/144; H04N 7/147; H04N 7/14; H04L 65/4015; H04L 65/403; H04L 65/1089; H04L 65/401
See application file for complete search history.

(56) References Cited

U.S. PATENT DOCUMENTS

| | | | |
|---|---|---|---|
| 6,590,602 B1 * | 7/2003 | Fernandez | ............. H04N 5/445 |
| | | | 348/E7.071 |
| 2017/0180438 A1 * | 6/2017 | Persson | ................. G10L 21/055 |

* cited by examiner

*Primary Examiner* — Yosef K Laekemariam
(74) *Attorney, Agent, or Firm* — ONE LLP; Samareh Afrasiabi

(57) ABSTRACT

Systems and methods for using a digital overlay screen during a video telecommunication. The digital overlay screen comprises content, such as notes or a script, which a presenter may reference during said video telecommunication. The digital overlay screen may tether to an underlying network conferencing program or a video captured from an image capturing device of a user's device. The digital overlay screen is arranged relative to the image capturing device such that the presenter can review the content therein while simultaneously establishing and maintaining a line of sight with the device. The digital overlay screen may overlay on a video feed of the telecommunications without distorting said feed, and without being transmitted or visible to third party recipients of the presentation.

16 Claims, 10 Drawing Sheets

DIGITAL OVERLAY

CROSS-REFERENCE TO RELATED APPLICATIONS

The present application is a continuation of U.S. patent application Ser. No. 17/685,169, filed Mar. 2, 2022, which claims priority to U.S. Provisional Patent Application No. 63/156,277, filed Mar. 3, 2021, the entire contents and disclosures of which are hereby incorporated by reference.

FIELD

The subject matter described herein relates generally to the field of video telecommunications and, in particular, to systems and methods for the use of digital overlays in the recording, streaming and presentation of content over video teleconferencing services.

BACKGROUND

As digital electronics and network communications are becoming increasingly popular, users are shifting to real-time interactive networked conferences as a means to facilitate business meetings, speeches or presentations to groups, medical & teletherapy meetings, lectures to students, lawyer arguments to court, and the like. Network conferencing platforms, including but not limited to Zoom, Microsoft Teams, BlueJeans, FaceTime, Skype, Webex Meetings, and GoTo Meeting, allow individuals to share text, images, audios, videos, and other data by sharing their computer screen in real-time to participants in remote locations. In many instances, a user engaged in a video-based interaction may have content prepared in anticipation thereof. For example, a presenter may have a script, notes, talking points, key data, information, or the like, that they may wish to review or reference during a video presentation. However, these are not shared with the audience or even desired to be shared with the audience by the presenter and so instead when a presenter viewing, referring to or reading from notes positioned outside the video stream's device's (e.g., the camera) field of view he or she may fail to establish and maintain a line of sight with said video streaming device, thus, leading to the presenter losing "eye contact" with the audience and resulting in a distracting, less professional and/or persuasive, and lower quality viewing experience for the viewer(s) and less effective presentation, discussion, meeting, argument, sales pitch, conference, etc. by the presenter. And a presenter's associates may wish in the moment to tell the presenter to say or not say something in particular and be able to communicate to the presenter without the presenter looking away and/or notifying the viewers/audience that the presenter is being given directions, information or data by third parties, but currently that requires looking away to another device or screen or being handed a note that one then has to look away and read. Therefore, it would be advantageous for content (pre-determined or real-time delivered by presenter's associates) the presenter wishes to reference during a presentation to be digitally overlaid via a display in a manner such that said content is visible to the presenter (e.g., a subject of the video), and not visible to a recipient or audience of the video stream, or optionally, not rendered as part of the video recording. It would alternatively and additionally be further advantageous for the digital overlay to be tethered to the camera display of whatever network conferencing platform or program is being used, either as a digital overlay within the platform or program or as a stand-alone program where the tethering is done by the user or the stand-alone program, so that the camera-default field of view has the digital overlay field over it. It would also be advantageous to have these pre-determined data fields and message communications to occur when one is using augmented reality (AR) or virtual reality (VR) glasses, smart glasses or smart contact lenses to video present in lieu of a traditional computer/camera to engage in video conferencing activities or when using AR or VR glasses, smart glasses or smart contact lenses to video present in conjunction with a traditional computer/camera. Still further, it would be advantageous when a user is using AR or VR glasses, smart glasses or smart contact lenses in a live interaction and speaking to a physically present audience (such as a lawyer to a judge or jury, or a speaker in a TED talk, a doctor to a patient, a sales pitch to a client, for example) to have access to the same data fields or message communications features.

Additionally, the presenter and subject of the video may not have sufficient experience or knowledge relating to the substance of the presented dialogue, or may need help or assistance in their presentation, and may wish to consult or confer with a colleague, or may wish or be required to receive advice and guidance from a colleague, during the video (or live) presentation in a manner that is not distracting and in a manner that the viewers do not even know is occurring. Thus, it would also be advantageous to transmit or retrieve messages, share notes, files, images, and/or other data by and between the speaker and an associate in real-time, wherein said data or communications are digitally overlaid and broadcasted on the display in a manner such that said outgoing/incoming information the speaker may utilize in making their presentation is visible only to them, and not visible to a recipient of the video stream, and optionally, not rendered as part of the video recording.

It would be further advantageous to have the aforementioned digital overlays be oriented such that the rendered video stream gives the appearance to the viewer that a subject has not lost eye contact with the audience and is looking directly at the camera for the duration of the video presentation so that they present more appropriately, professionally, polished and/or in a more appealing manner as a speaker or presenter.

SUMMARY

The field of the subject matter described herein relates generally to video telecommunications. In particular, the field relates to systems and methods for the use of digital overlays in the recording, streaming and presentation of content over video conferencing services.

In an embodiment, an event-based digital overlay system includes an application, wherein text-based and interactive content is displayed over the native video streaming field of view for the video conference (i.e., over the Zoom or FaceTime (or other such program) field of view) therein for a presenter to reference during a video telecommunication. Digital imagery data of the video may be captured from, for example, an image capturing device of a user's device, or an external camera operatively coupled to a user's device, and may be streaming to and from a network conferencing program or the like. The digital overlay system allows users to create digital overlay events comprising digital overlay screens with fields having content the user wishes to reference or review in real-time during a presentation. The digital overlay screen comprising said content may be tethered to the camera display of the underlying network conferencing program or may be a separate program that is then opened and sized to the video streaming screen visible to the subject. Further, the video feed from the image capturing device or network conferencing program, or the like, are simultaneously displayed on an electronic display of the user's device via a user interface. The digital overlay screen is projected on the user interface so as to at least partially (if not also fully) superimpose or overlay over the video feed in a manner in which the video imagery data is not significantly blocked or distorted. The digital overlay screen is also methodically arranged such that the presenter may read the content therein without seeming to look away from the camera's focal point and also without losing sight of the viewers or having their appearances distorted or lost. The digital overlay screen and its content is only visible to the presenter, and not visible to the recipients of the presentation. The content may be customizable as to location on the digital overlay screen or may have pre-determined locations. In this way, the user is able to discreetly review content from the screen's fields while concurrently viewing the video feed, all while appearing to and/or in fact maintain eye contact with third parties interacting via the video feed or a network conferencing program.

Other systems, methods, features and advantages of the subject matter described herein will be or will become apparent to one with skill in the art upon examination of the following figures and detailed description. It is intended that all such additional systems, methods, features and advantages be included within this description, be within the scope of the subject matter, and be protected by the accompanying claims.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Figure 1:
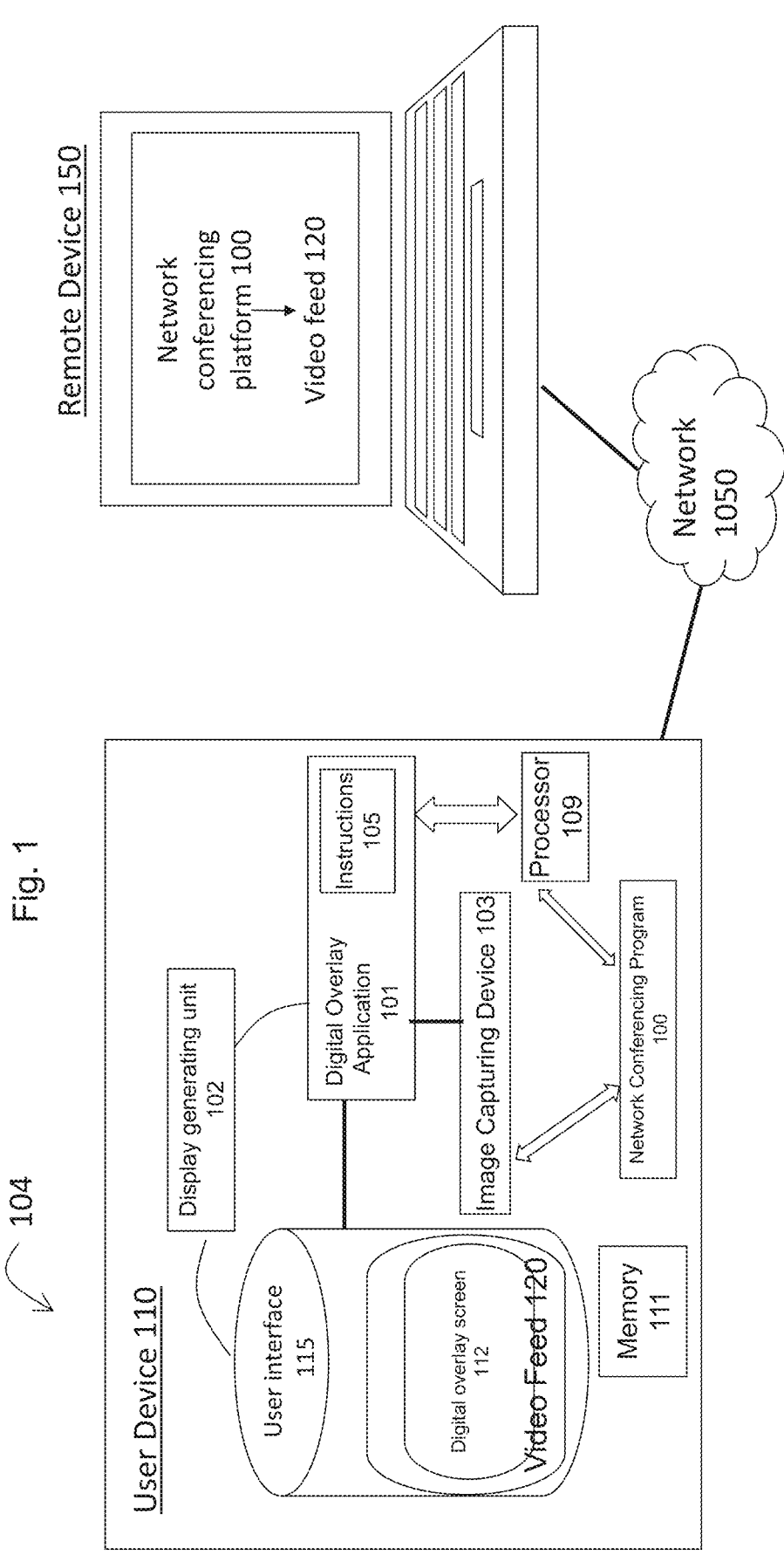
FIG. 1 is a block diagram illustrating a digital overlay system, according to an embodiment.

While the present subject matter described herein is susceptible of embodiment in various forms, some of which as shown in the drawings, hereinafter will be described the presently preferred embodiments of the subject matter with the understanding that the present disclosure is to be considered as an exemplification of the subject matter, and it is not intended to limit the subject matter to the specific embodiments illustrated.

The subject matter described herein addresses the aforementioned disadvantages by providing improved systems and methods for rendering video recordings and presentations with digital overlays. Specifically, an event-based digital overlay system is described which provides a digital overlay application for dynamically displaying text-based content, in real-time, during a presentation, recording, and/ or streaming of a video. FIG. 1 includes a block diagram illustrating the event-based digital overlay system 104. In FIG. 1, 101 represents the digital overlay application which may be stored and executed by a user device 110, such as a computer, and uses software which executes program code to interface with an optically active device or image capturing device 103 of said user device 110, which may be communicatively coupled to a video browser program, video rendering program, or a network conferencing platform 100 of the like.

Specifically, the user device 110 may comprise at least one processor 109, an optically active device or image capturing device 103, a display generating unit 102, and at least one memory 111. The at least one processor 109 is capable of manipulating data in accordance with a set of instructions 105. For example, the at least one processor 109 may be configured to execute programs based on software or a set of instructions 105 from the memory 111. For instance, the at least one processor 109 is configured to initiate communication with the underlying network conferencing platform 100 and/or the digital overlay application 101 to provide data to and/or request data from said underlying program 100 and/or the digital overlay application 101. For instance, the digital overlay application 101 can initiate a request to the underlying program to stream a video recording, join a live video, and communicate with third parties logged onto the underlying video/network conferencing program 100, etc. Additionally, in response to a set of instructions, the digital overlay application 101 may generate a digital overlay screen 112 to be displayed on a user interface 115. In some embodiments, a bus architecture is utilized. The bus may include any number of interconnecting buses and bridges depending on the digital overlay application 101, the underlying program 100, and the overall design constraints.

The digital overlay application 101 interfaces with one of the underlying network conferencing programs 100 and cooperates with the display generating unit 102 so as to generate a digital overlay screen 112, which may tether to the camera display of the user device or underlying program 100 and is electronically projected onto the user's device 110 via a user interface 115. Concurrently, video captured from the image capturing device 103 of the user device 110 is transmitted or streamed to a video rendering of one or more remote devices 150, without transmission of the digital overlay screen 112. The digital overlay system 104 may capture the digital imagery, or video feed 120, captured by said image capturing device 103 and stream or transmit it to the user device 110, and a remote server or remote devices 150 connected to the underlying networking program 100. In some embodiments, the video feed may comprise digital imagery of the user, other audience members from remote devices (e.g., zoom participants), or a combination of both. The digital overlay screen 112 may overlay the video feed 120 such that it does not distort the digital imagery data transmitted therefrom.

The network conferencing program 100 may be Zoom, Microsoft Teams, BlueJeans, FaceTime, Skype, Webex Meetings, GoTo Meeting, or any other program which allows individuals to video conference efficiently and in real-time to participants on remote devices in remote locations. Optically active devices or image capturing devices 103 may include a camera device or recording device of a personal computer, portable, mobile, wearable, hand-held device (e.g., smartphones, laptops, or personal digital assistants (PDAs)), or other machines of the like. More specifically, the image capturing or recording device 103 may be the integrated front facing camera or back facing camera of a user device, or an external camera operatively coupled to a user device. Moreover, optically active devices 103 may include AR, VR, or smart glasses, smart lenses and similar gadgets, such as AR/VR Glasses.

The optically active device 103 may be communicatively coupled via a network 1050, program, or the like, that is being executed on a video rendering program 100 on one or more remote devices 150. For example, the camera or image capturing device 103 may be communicatively coupled with a network, such as the internet, intranets, extranets, wide area networks (WANs), local area networks (LANs), wireless networks, wired networks, a plurality of the aforementioned networks, and other suitable networks determined by one skilled in the art.

The digital overlay system 104 also enables network conferencing programs 100, and the like, to embed the functionality of the application 101 to their program 100 by adding a script to their platform. In some embodiments, the script may be a single line of Java script. The Java script may load from one or more servers that contain the instructions required to interface or systematically tether the digital overlay application 101 to said program 100.

General Overview of the Digital Overlay Application Ecosystem

Figure 2:
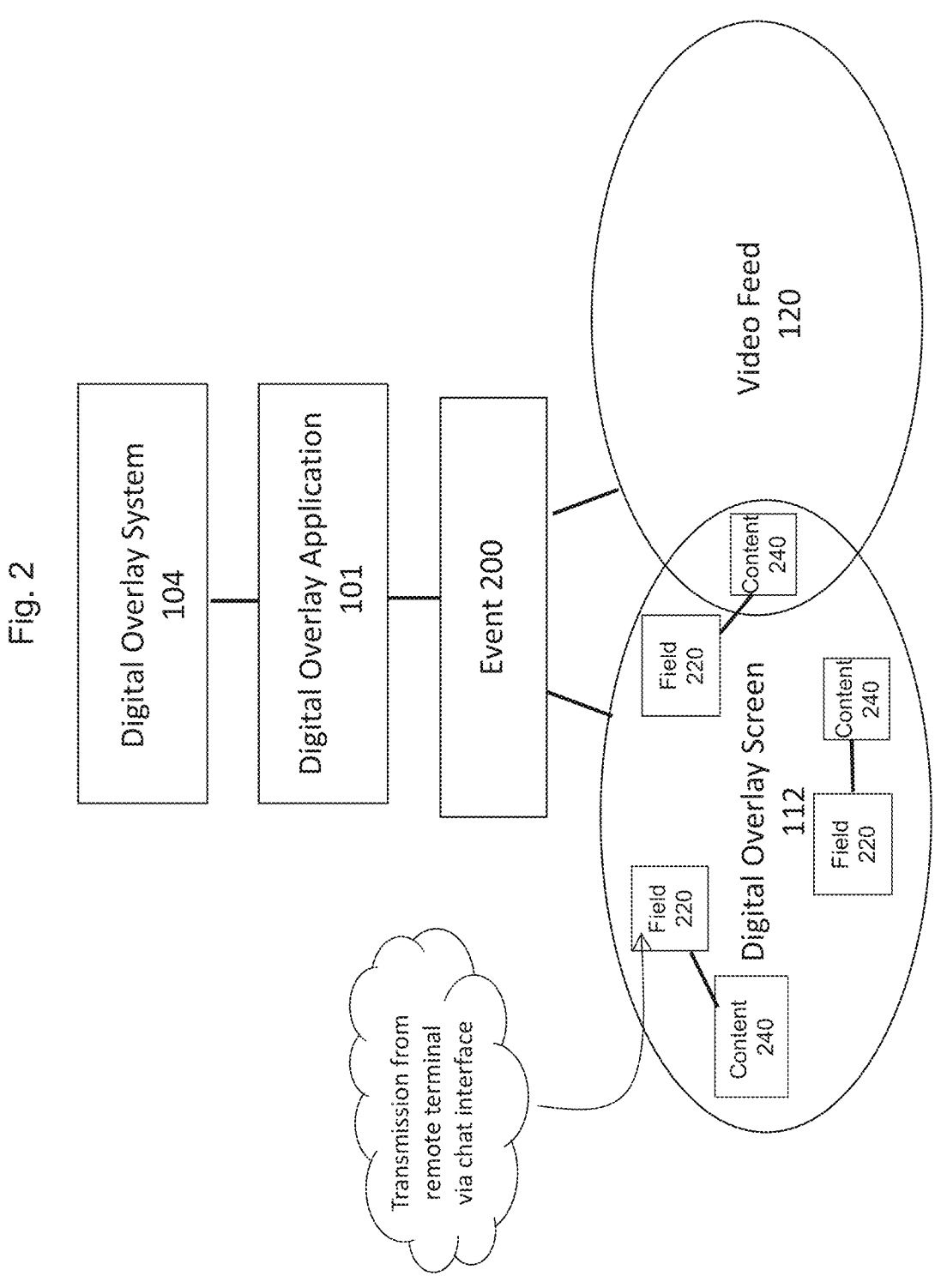
FIG. 2 is a flow chart illustrating the ecosystem of the digital overlay application in the digital overlay system, according to an embodiment.

FIG. 2 illustrates the general ecosystem of the digital overlay application 101. The digital overlay system 104 comprises the digital overlay application 101, wherein a user (or presenter) may create an event 200 associated with a video feed 120 for a presentation, recording, or streaming. An event 200 may include one or more unique digital overlay screens 112 comprising of one or more fields 220 which include uploaded, downloaded, transmitted, inputted, or otherwise generated digital content 240, such as messages, notes, a script, or the like, which are associated with a video presentation. As detailed further below, the digital overlay screen 112 may include a chat interface known in the art that enables approved participating viewers or other third-party attendees at remote terminals of the digital overlay application to communicate with each other and the presenter via message exchange in real-time throughout an event. In this way, a new content field or box 220, comprising messages, audio, pictures, files, multimedia, and other data and information of the like, may be transmitted to the presenter during the event 200.

As shown in FIG. 1, the digital overlay screen 112 comprising the digital content 240 (including content 240 transmitted from external sources) is then digitally overlaid over the presentation's video feed 120 on the user interface 115. In this manner, the content 240 projected from the digital overlay screen 112 is visible to the presenter (and any invited associates who are helping or communicating with the presenter by pre-approval), but not visible to the audience, and is not distorting the underlying video feed 120. Moreover, the digital overlay screen 112 may comprise AR or VR functionality such that the projected digital overlay screen 112 is a digital AR or VR overlay screen.

Specifically, the user creates an event on the digital overlay application 101 which corresponds to one or more video presentations. Once an event 200 is created, the user may input image, text-based, or interactive content 240 for the event 200. Said digital content 240 is then uploaded into one or more fields 220, and may then be locally recorded, for example, within a storage module of the digital overlay application 101 or stored in an event-files database, such as an event-storing database. The content 240 may be generated on a digital overlay screen 112 when the user opens the event 200. Specifically, the digital overlay screen 112 is dynamically displayed on the user interface 115 and presented on an electronic display of the user's device 110 when the user opens the event 200. More specifically, the user interface 115 comprises the digital content 240 from the digital overlay screen 112 in addition to the video feed 120 captured from the image capturing device 103 or associated with the underlying network conferencing program 100. Even more specifically, the digital overlay screen 112 is projected onto the user interface 115 such that it at least partially superimposes or overlays the video feed 120. The digital overlay screen is configured over the video feed in a manner such that it does not distort the video feed's 120 imagery data or alert third party video recipients of its existence or use.

Digital Overlay Application

Figure 3:
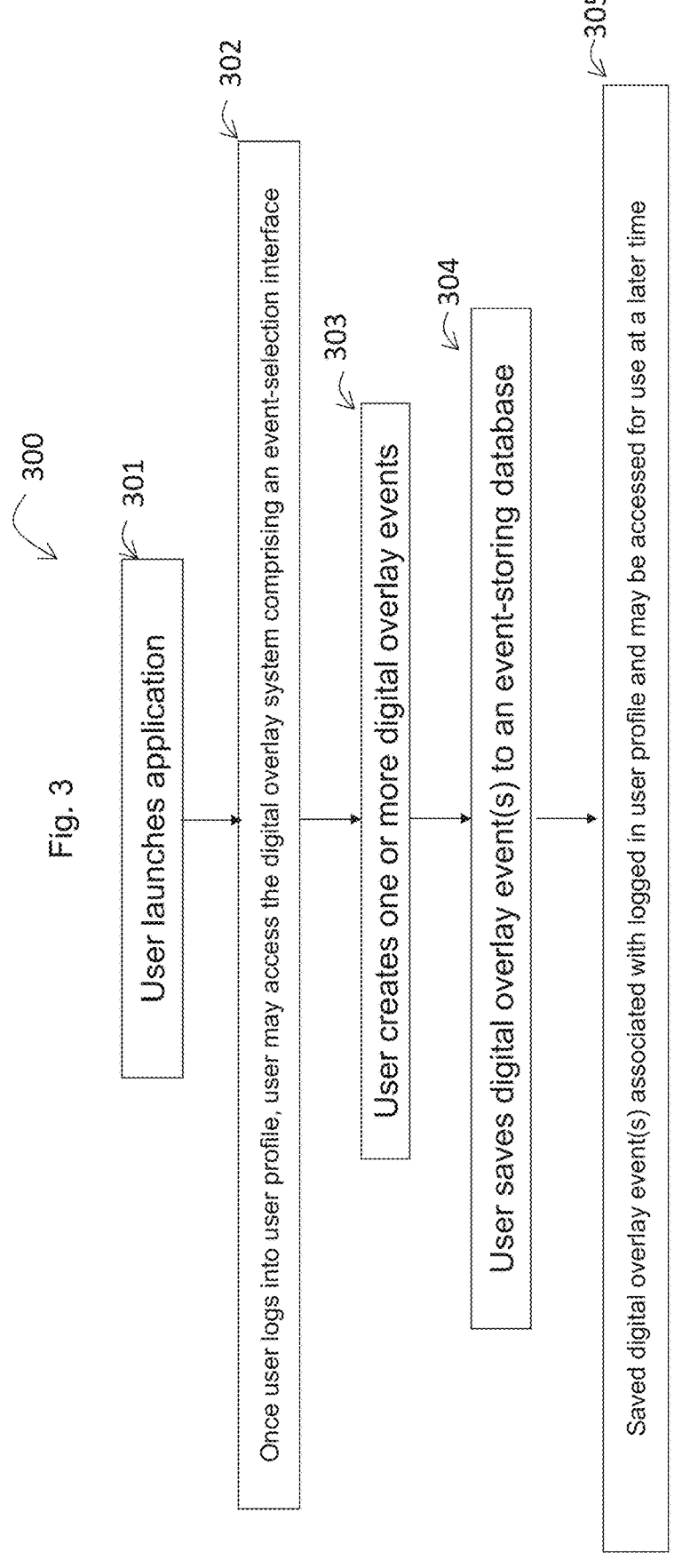
FIG. 3 is a flow chart illustrating an example method for creating digital overlay events with the digital overlay system, according to an embodiment.

FIG. 3 is a flow chart illustrating an example method 300 for creating digital overlay events 200 with the digital overlay system 104. The digital overlay application 101 is designed to provide users with the ability to create personalized user profiles distinguishable by unique user log-in credentials. In block 301, the user launches or starts the digital overlay application 101. Once the digital overlay application 101 is launched or started, in block 302, the user may log into their user profile and access the digital overlay application's 101 event-selection interface. In block 303, the user creates one or more digital overlay events 200 through the event-selection interface. In block 304, the user saves the digital overlay event(s) 200 to the event-storing database. In block 305, the saved digital overlay events 200 are then associated with the user and their respective presentation via the user's profile, and may be accessed by the user at a later time.

Figure 4:
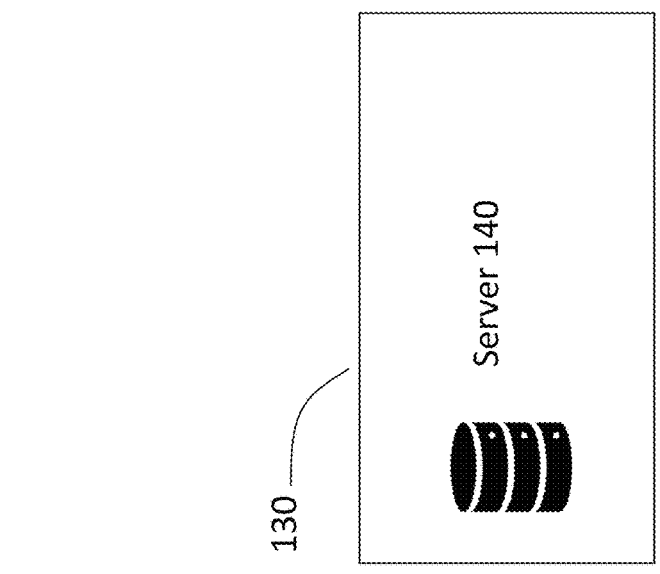
FIG. 4 is an exemplary diagram of a multi-participant video telecommunications interaction according to an embodiment.
Figure 4:
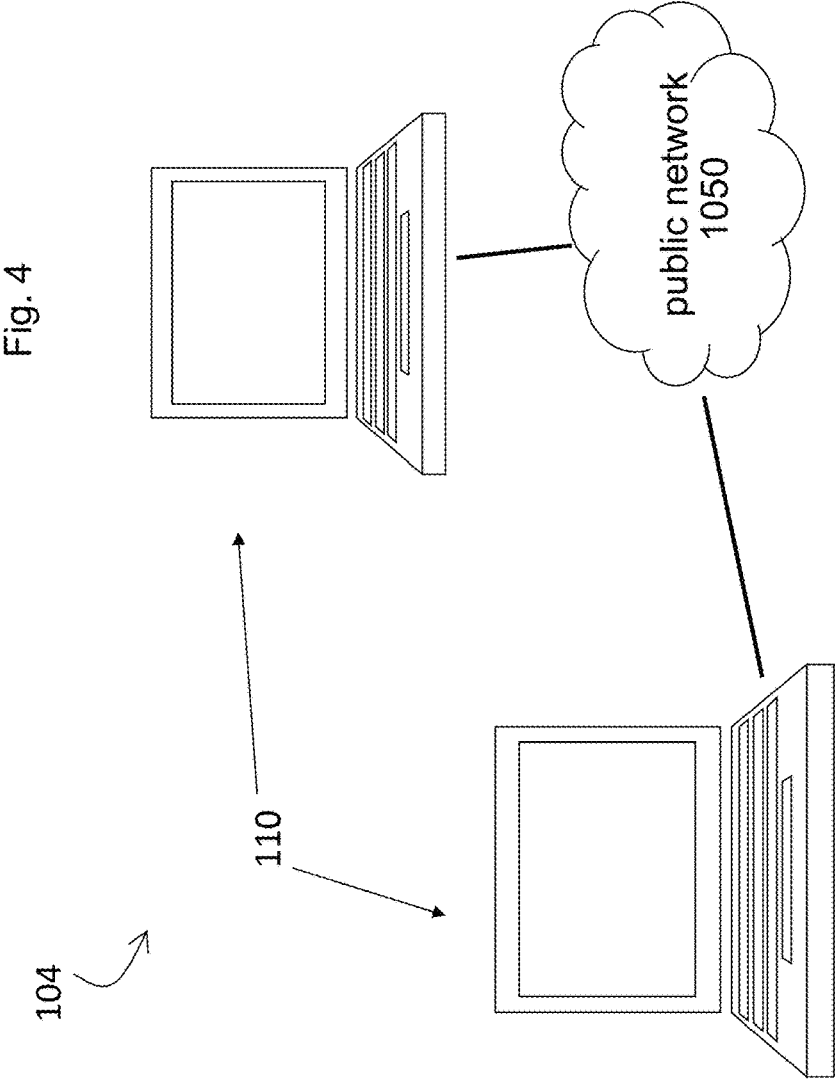

Turning to FIG. 4, users can install the digital overlay application 101 on their user device 110, such as a personal computing device (or any machine capable of executing a set of instructions (sequential or otherwise) that specify actions to be taken by the processing system described herein) to establish an event 200 through the digital overlay application 101 which may operate as a standalone application (a digital overlay platform), or interface with a network conferencing platform 100. Specifically, the digital overlay application 101 can establish or interface with an interactive video telecommunications session, for example, over a public network 1050, with the digital overlay application's datacenter 130, which can provide for real-time data exchange interactions with a plurality of third parties during an event 200. In a networked deployment, the processing system may operate in the capacity of a server 140 or a video telecommunications machine in a video telecommunications-server network environment, or as a peer machine in a peer-to-peer (or distributed) network environment.

Multiple users may collaborate or work separately on one event 200. Multiple users may work in tandem or separately from the same terminal or from different remote terminals. In some embodiments, each event 200 may include one or more unique digital overlay screens 112 comprising one or more fields 220 with desired digital content 240 associated with one or more unique user presentations or videos which may be rendered at some later point in time. For example, two users in the exact same physical location may create separate digital overlay screens 112 with fields 220 comprising different content 240 for the same event 200, which are associated with one presentation occurring at a future time. In this instance, when User 2 takes over the event 200 from User 1 at the same terminal/user device 110, then the digital overlay application 101 can be automatically or manually toggled, e.g., by pressing a key or combination of keys, to User 2's digital overlay screen 112 and field 220 associated with their personalized, predefined event content 240. The presenting user's digital overlay screen 112 is configured to overlay over the underlying platform or program 100, and video feed 120.

Figure 5:
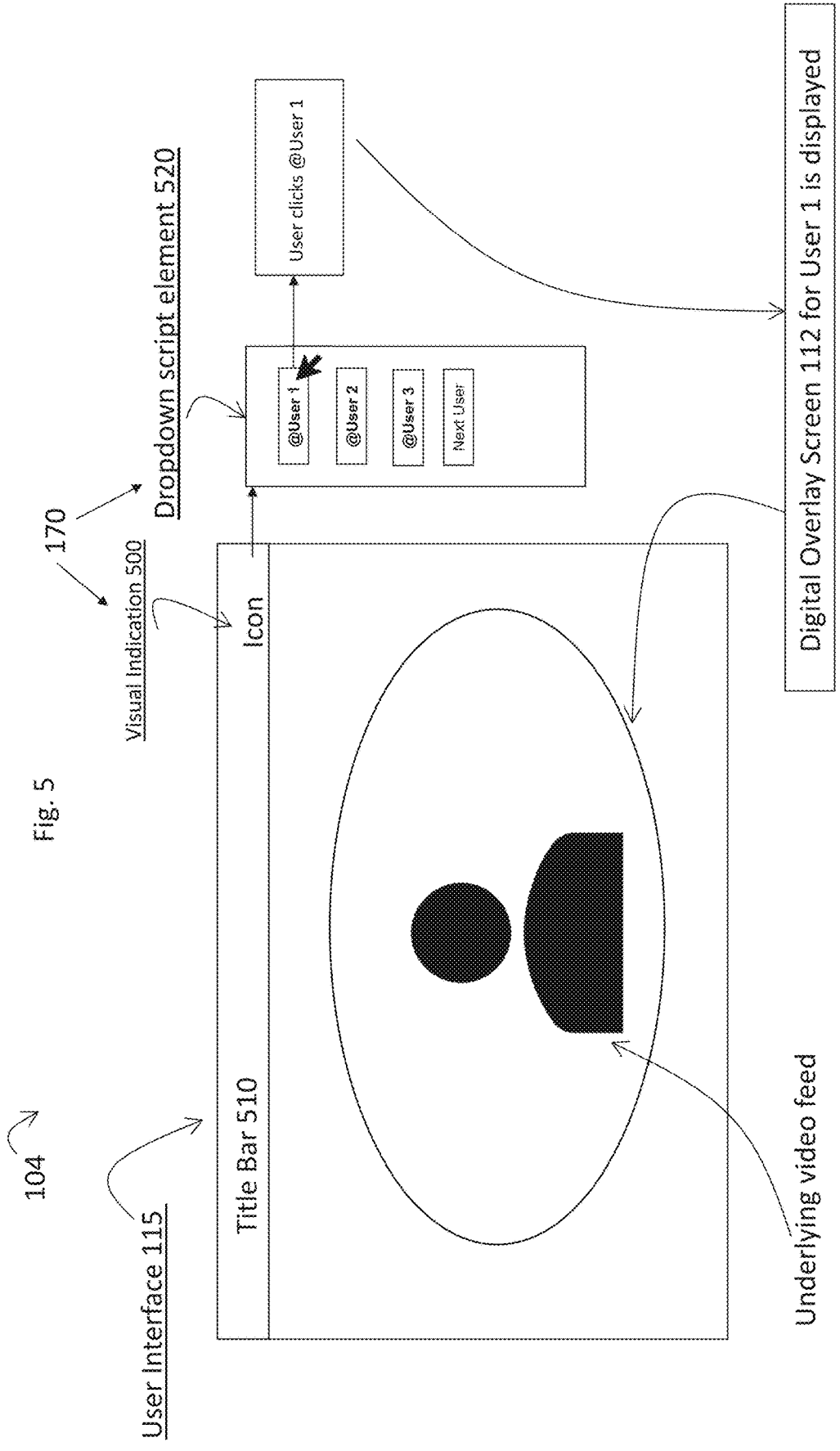
FIG. 5 is an exemplary user interface, illustrating event controls, according to an embodiment.

Turning to FIG. 5, each user is able to manage their portion of the event 200 and take control thereof by utilizing the application's 101 event controls 170 which include one or more selectable options (e.g., icons, buttons, etc.) relating to parameters defining an event 200, its digital overlay screen 112/content 240, and users associated therewith. For example, a user may switch profiles by using the event controls 170, and by doing so, take control of a given event 200 by generating their digital overlay screen 112 on the displayed user interface 115. Here, for example, the event controls 170 change the user interface 115 by displaying the digital overlay screen 112 of a different user for the same event 200.

The user interface 115 may comprise a title bar 510 with a visual indication 500 (e.g., an icon) that indicates other user profiles available for presentation in the event 200. In some embodiments, clicking on the visual indication 500 allows the user to browse and click on an element in order to select a new user to take control of said event 200. As illustrated in FIG. 5, the user interface 115 may also include a dropdown script selection element 520 which displays a sorted list of identifying information associated with a user's profile, e.g., a user's log-in handle (@User 1, @User 2, @User 3, etc.). The user may click on the information associated with a specific user's profile, or enter identifying text corresponding to the specific user's profile (i.e., their user name), so as to make them the controlling user for that event 200. In some embodiments, when multiple digital overlay screens 112 or fields 220 are to be used for a single event 200, users may pre-fix the order in which the overlay screens 112 are deployed during the event 200. In some embodiments, the dropdown script selection element 520 provides a "next user" button, as shown in FIG. 5, which allows the digital overlay screens 112 to be dynamically populated in the pre-set order determined by the user(s)/event administrator(s). Although the event controls 170 described above depict interface elements for rendering control of display overlay screens 112, one skilled in the art will recognize that other types of interface elements may be used.

Figure 6:
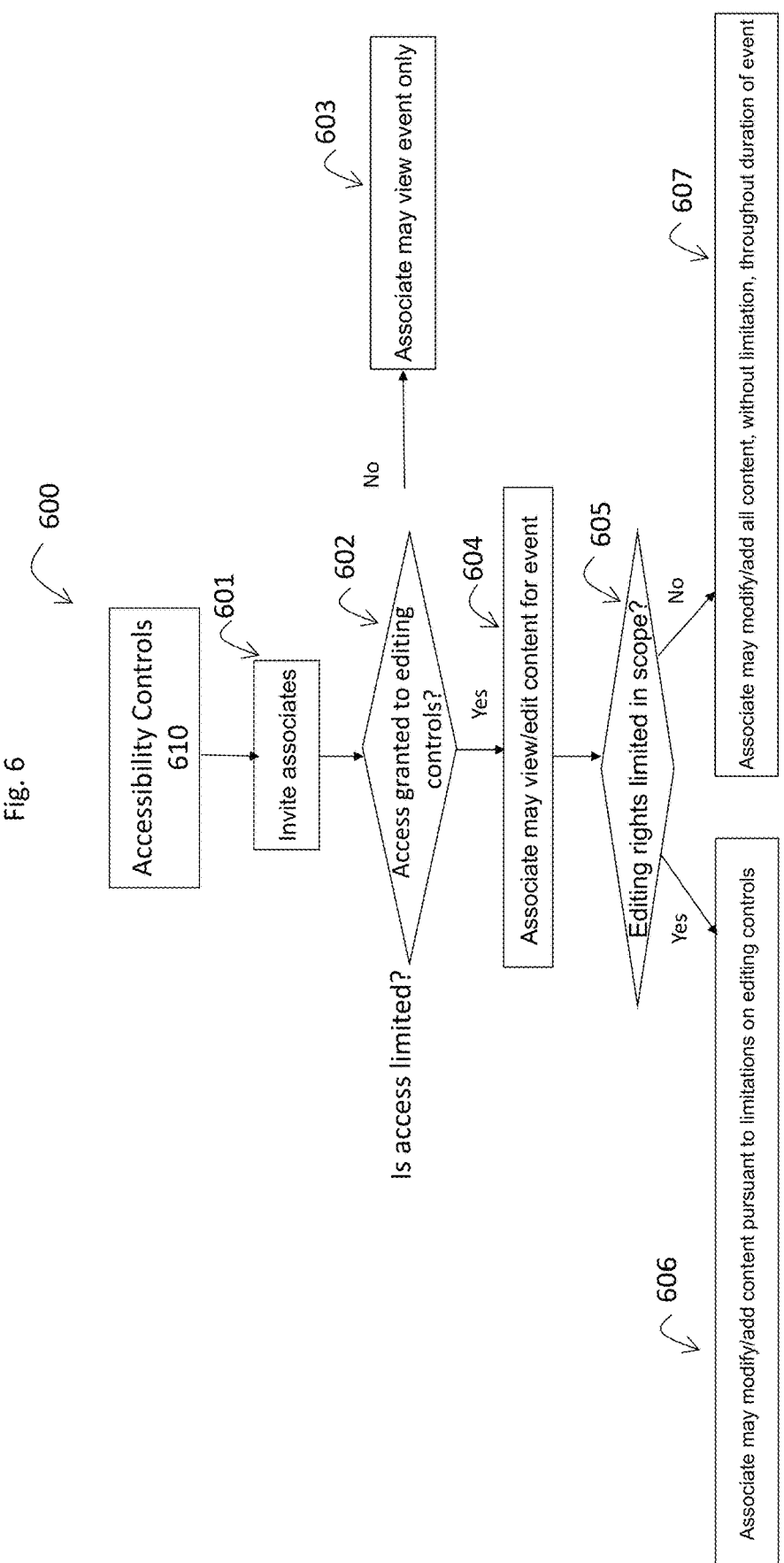
FIG. 6 is an exemplary process for the accessibility controls of an event, according o an embodiment.

FIG. 6 illustrates an exemplary process 600 for the accessibility controls 610 of an event. In some embodiments, users may restrict or limit accessibility of an event 200 by using accessibility controls 610. Specifically, a user may restrict who may attend or limit access to a particular event 200, and also grant non-presenter associates the ability to create and "push" content boxes to the digital overlay screen 112 of the user, presenting in real-time during the rendering of an event 200.

When creating an event 200, a user may use accessibility controls to invite associates (block 601). Each user and invited associate must have unique application 101 credentials to participate. Associates invited to an event 200 are granted access to view content 240 therein. However, editing controls may limit or restrict an invited associates' access (block 602). Specifically, an invited associate not granted editing rights will only be allowed to view the event 200 (block 603). Alternatively, an invited associate granted editing rights for an event 200 will be given the option to view and/or edit the content 240 (block 604). Further, the user may limit the invited associate's editing rights (block 605). An associate with limited editing rights may modify content 240 pursuant to the limitations established by the user (block 606). An associate granted editing rights not limited in scope, may modify all content 240, without limitation, and in real-time, throughout the entire duration of the event 200 (block 607). In some embodiments, the user may choose to lock editing rights for particular fields 220 and leave other fields 220 modifiable throughout the duration of an event 200.

Furthermore, users may choose parameters which require a confirmation request prior to content modifications or notes transmitted from third parties being applied to the field 200. Based on the user's response to the confirmation request, the application 101 may modify the content 240 of the event 200. In this way, the user can confirm or decline any automatic or transmitted modifications or additions to content 240. The user can confirm using a tapping or clicking response to confirm said change. For instance, a single tap is to confirm the change and a double tap is to decline the change.

In some embodiments, the user may choose to limit access to associates, so that a particular associate, for example, may only be given the option to send chat messages, as described in further detail below, rather than push content 240 in fields 220 to the presenter's digital overlay screen 112. Other third-party event attendees may connect to the video feed 120 of a particular event 200 through the underlying network conferencing platform 100, or the like. For example, a third-party attendee may connect to the video feed 120 for a particular event 200 via Zoom, Facetime, etc. In this way, third party attendees connected to the video feed 120 view the user, or presenter, speaking to the image capturing device 103, or camera, but do not have access to, receive, or see the user's digital overlay screen 112 or its content 240 therein. One primary benefit of this technology is to help enhance the presentation experience and quality of a presenter by allowing the presenter to reference notes or facilitate real-time guidance from third parties during a presentation, without notifying viewers of the foregoing or creating the perception that the presenter has lost eye contact with the camera and/or audience. Users may utilize this technology during a live presentation or a pre-recorded presentation. This technology among other things helps achieve the appearance to the audience that the presenter is in command of the presentation and has diligently rehearsed or is well-prepared for the speech, presentation, interview, argument, etc. and helps the presenter better present because the presenter has the comfort of knowing notes and data are available as needed without having to look away or look flustered.

The Digital Overlay System and Process

The digital overlay application 101 of the event-based digital overlay system 104 comprises an event-selection interface which allows users to create one or more digital overlay events 200. Each digital overlay event 200 is associated with one or more digital overlay screens 112, which may comprise one or more fields 220 which are digitally displayed to a user via a user interface 115 of a user device 110, such as a computing device. The digital overlay system 104 can include frontend services such as, but not limited to, graphical user interfaces (GUI), communication modules, and application program interfaces (APIs) that enable the application 101 to connect to a user device 110. The application 101 can also include backend services, such as, but not limited to machine learning (ML) and/or artificial intelligence (AI) algorithms (including but not limited to algorithms pertaining to voice and eye analysis) configured to analyze various types of data collected from the application 101 to create optimized digital overlay events 200 for the user. For example, AI algorithms may monitor the user's speech logistics during an event 200 to determine what action, if any, should be taken.

Figure 7:
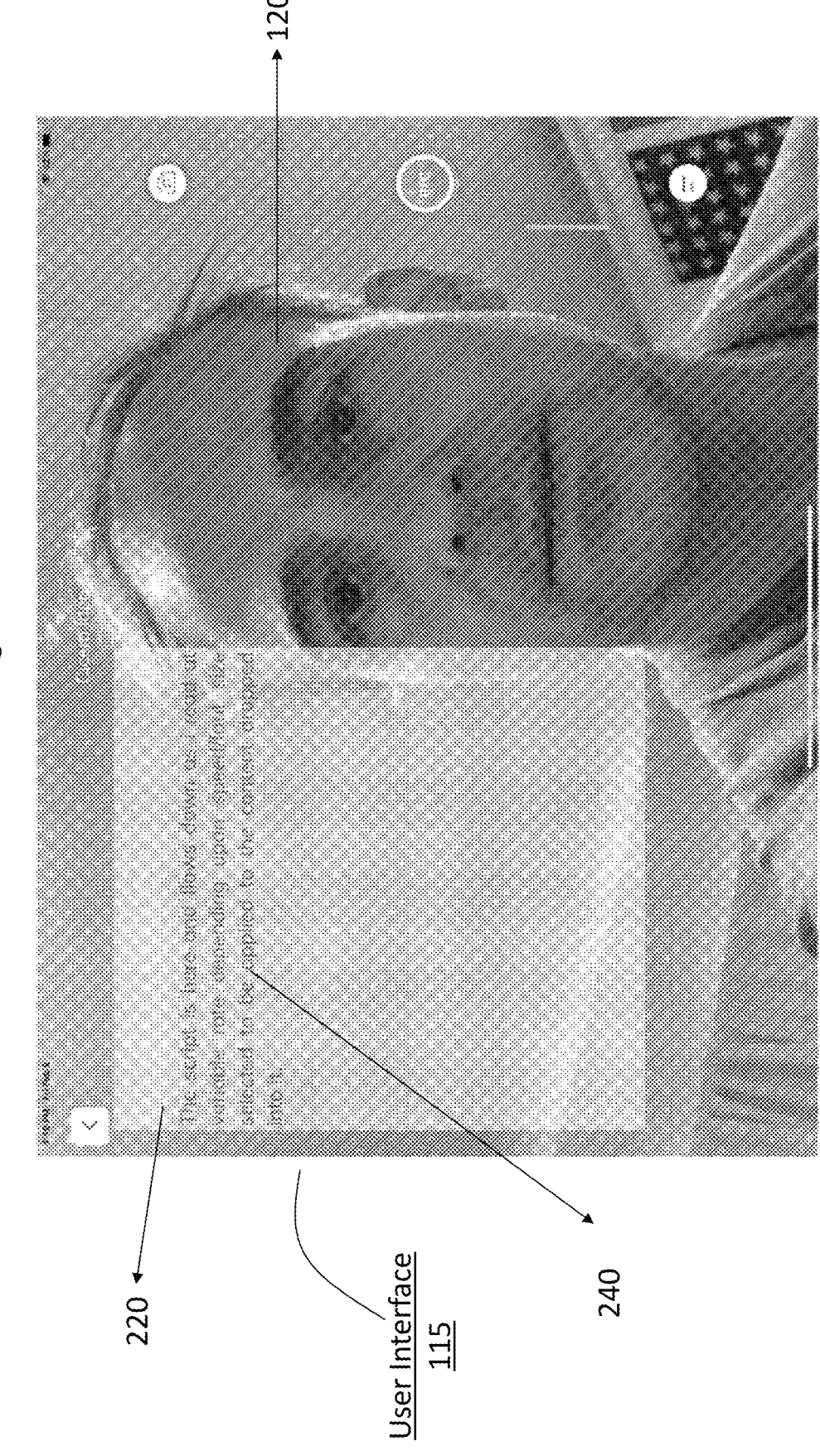
FIG. 7 is an exemplary user device comprising an exemplary user interface, according to an embodiment.
Figure 8:
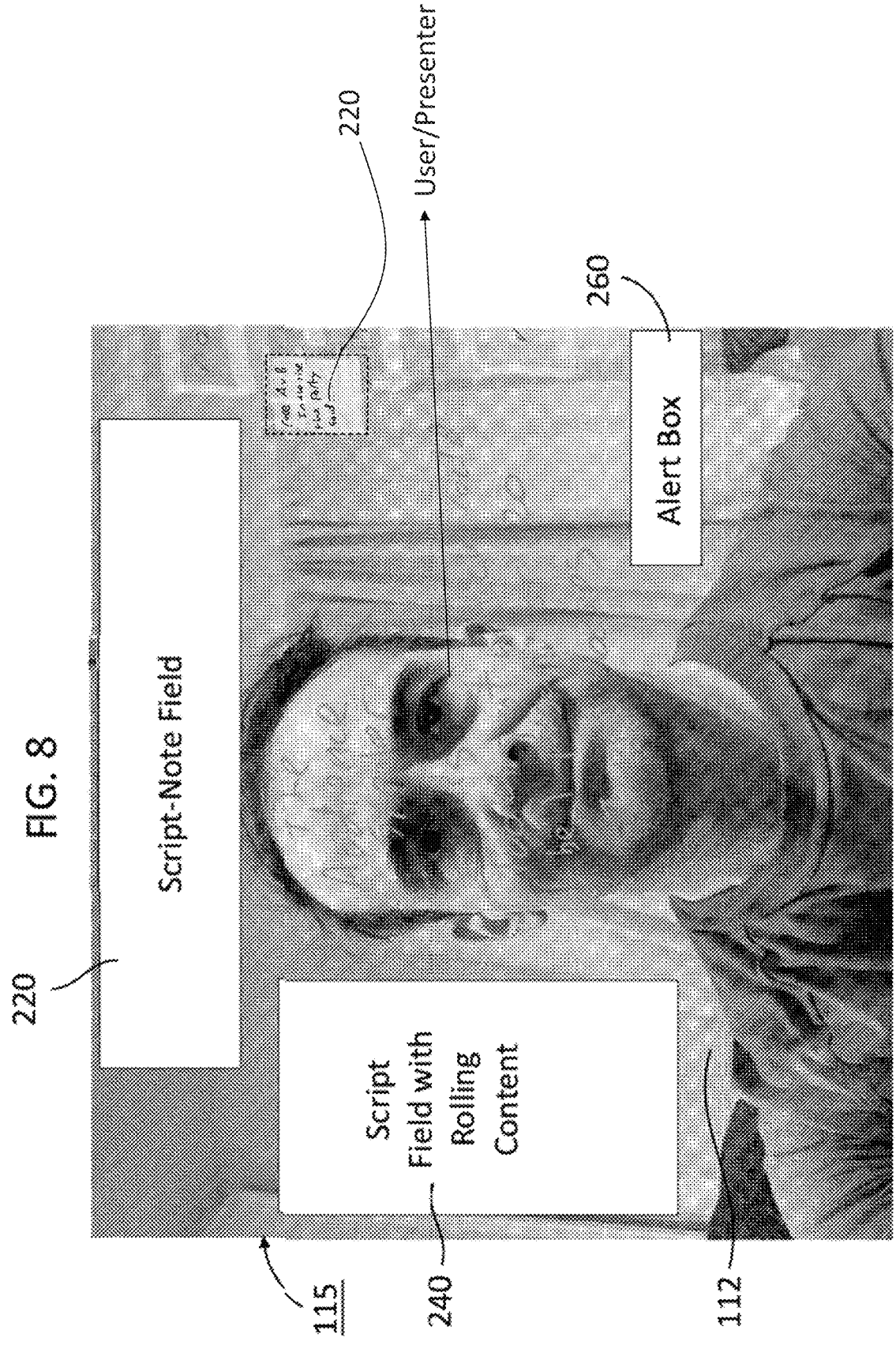
FIG. 8 is an exemplary user interface, according to an embodiment.
Figure 9:
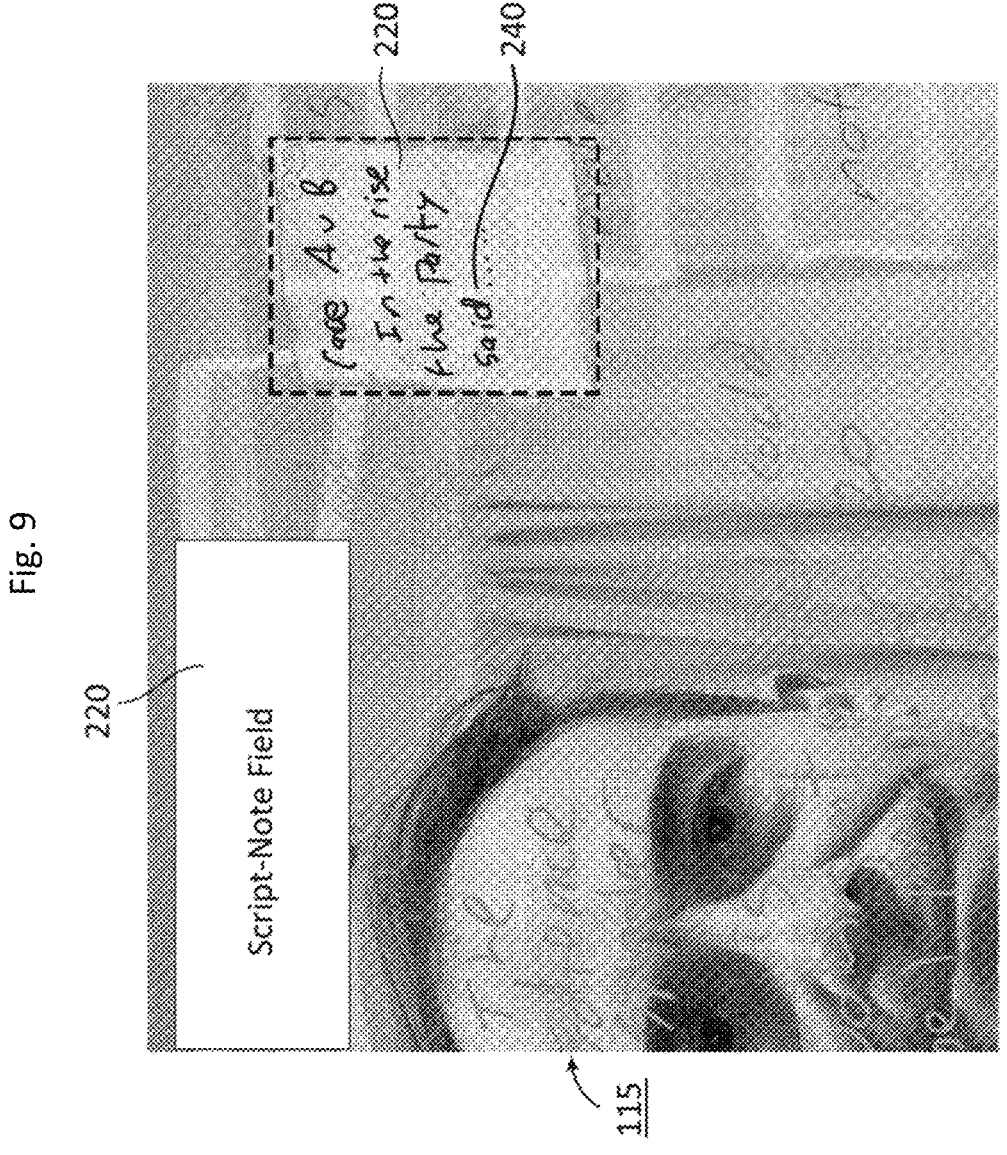
FIG. 9 is a close-up of the exemplary user interface illustrated in FIG. 8 wherein a field comprising content has been enlarged, according to an embodiment.

As illustrated in FIGS. 7 through 9, in an embodiment, the user interface 115 may be a GUI (or special interface or graphical trigger) configured to be dynamically presented on an electronic display of the user's device 110 to display, (1) the video feed 120 generated at least in part by the image capturing device or optically active device 103, such as a camera device, which may be communicatively coupled to an underlying video rendering program 100, (2) the digital overlay screen 112 generated by the application 101 and comprising interactive features, such as a script or messages.

When a user logs into the application 101, they may open and upload necessary content 240 to one or more fields 220 of one or more digital overlay screens 112 for an event 200. A field 220 may comprise predefined date, notes and/or content content boxes or customizable boxes which can be altered in size, color, dimension, shape, location, and/or placement. For example, the fields 220 may comprise square boxes, rectangles, circles, shapes which may be uniform in dimension, or which may vary in dimension along different axes. Various sizes, dimensions, shapes, configurations, and constructions can be determined by those skilled in the art. Furthermore, fields 220 may be configured such that they change size during an event 200. As illustrated in FIGS. 8 and 9, for example, a particular field 220 may remain minimized or small in size until its content 240 is being utilized in the video presentation, wherein (by either user selection in the moment, by pre-defined voice recognition-based commands or other pre-determined directions, for example) it maximizes or enlarges in size (the change in field 220 scale is represented by broken lines in FIGS. 8 and 9) and configures itself on the user interface 115 in a manner as to yield a line of sight of a user corresponding to the field of view of the camera device (and may also collapse away based on similar directions and/or commands).

Fields 220 may comprise content 240, such as, text, audio, images, documents, uploaded files, and the like, which are projected onto the user interface 115 and accessible to the user during a rendering of an event 200. In some embodiments, the user may generate handwritten notes as digital content 240. For example, by utilizing a finger-stroke, stylus/smart pen, or device/method of the like, the user may write on a touch screen of the user device 100 (or other component of device 100 compatible with said pen or input), and transmit handwritten notes onto the device 100 such that they are displayed on the user interface 115 as digital content 240. As illustrated in FIGS. 8 and 9, the user may input handwritten text that is digitized and generated on the field 220 as handwritten digital content. In other embodiments, the application 101 may include software known in the art which can recognize and convert inputted handwritten text into regular typeface such that the digital content 240 produced on the user interface takes the form of digital typeface.

In an exemplar embodiment, the fields may include text of a script or facts and data or other content which the user wishes to review or reference in real-time during the duration of an event 200. Content 240 may be updated by users even during the duration of an event 200. Additionally, documents or images in, for example, Portable Document Format (PDF), Microsoft Word (Word), Joint Photographic Experts Group (jpeg), and Portable Graphics Format (png), may be uploaded into a given field 220 and, if desired, uploaded into a pure text form, such that the content 240 may be viewable to the user during an event 200.

In one embodiment, the content 240 within a given field 220 is responsive to shortcuts, such as Command-F (Ctrl-F), which allow the presenter of an event 200 to quickly find words or phrases. In some embodiments, the digital overlay application 101 comprises a files database which stores script templates or pre-scripted content which the user has saved and associated with their user profile and/or a given project, meeting, or event, and has the option to repopulate said script or template in preparation or use for a particular event 200.

Figure 10:
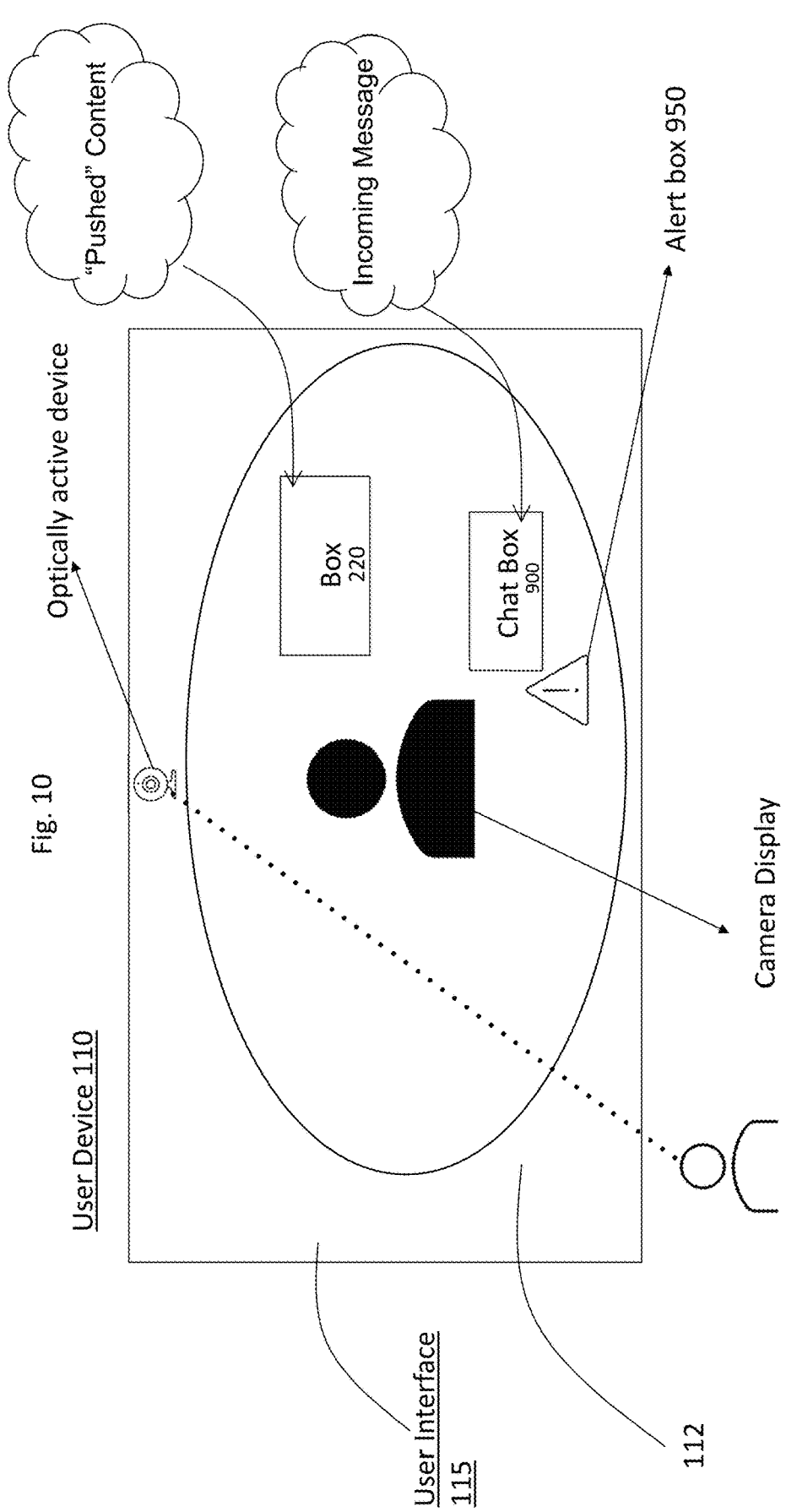
FIG. 10 is an exemplary user device comprising an exemplary user interface, according to an embodiment.

As illustrated in FIG. 10, the digital overlay screen 112 may also include the chat interface referenced above. The application's datacenter 130 provides for real-time interaction with a plurality of associates. For example, an associate logged into the digital overlay application 101 and watching a particular event 200 may create a new content field or box 220 and push it to the presenter of said event 200, or deliver a message in real-time via the chat feature to the presenter but which is not seen by the rest of the audience. The datacenter 130 may include a plurality of server systems operating on a plurality of server machines communicatively coupled to each other via, for example, a public network and/or a secure virtual private network. The server machines each include one or more processors, memory, an operating system, one or more input/output interface and one or more network interfaces all known in the art.

Further, audio, pictures, files, multimedia, and other data and information may also be exchanged in real-time with the chat engine. In one embodiment, the chat interface is comprised within a chat field or box 900. In some embodiments, the chat field or pushed box or field 220 comprising new content 240 will populate in a pre-determined location or in a different color than other boxes or fields 220 in the digital overlay screen 112 so as to alert, prompt, or notify the presenter that a new incoming message or content 240 has been received. Said alert, prompt or notification may be presented in an alert box 950. In some embodiments, a user is given the option to reserve a particular location on the digital overlay screen 112 for real-time content boxes 220 that are pushed to the main user or for messages exchanged through the chat interface. For example, as illustrated in FIG. 10, the upper right corner of a user's digital overlay screen 112 may be reserved for pushed content from associates, so that the incoming content 240 appears in a field 220 on the upper right corner and may be opened and viewed by the user. This allows for dynamic real-time updates to a specified field 220 so that said fields 220 are not only static based on pre-set texts, data, content, information or notations. In some embodiments, content 240 rendered within the fields 220 may be updated dynamically and in real-time based on received instructions and/or metadata associated with the incoming messages and push boxes 220. In some embodiments, the user may also enable the projection of said messages and push boxes 220 to be displayed automatically as default, not to be displayed as a default, or to be displayed only upon the user opening the content.

Moreover, the fields 220 and chat box/fields 900 are only visible to the presenter and not the viewers of the video presentation. If a video recording is taking place, the chat fields 900 are not rendered as part of the video recording. In some embodiments, the field(s) 220, including the chat messages exchanged in a given chat boxes 900, are projected in a near translucent or transparent manner such that they at least partially superimpose or overlay the underlying video feed 120 without distorting the video data captured and, further, in a manner in which only the user can see the content 240 of the field(s) and/or boxes 220. The digital overlay application 101 is configured to default field(s) 220, font type, font size and color, and other parameters that may impact the display and appearance of the digital overlay screen 112, such that the content 240 displayed on the digital overlay screen 112 is visible to the presenter and not visible to the viewers of the video feed 120, and such that the user may maintain a line of sight with the camera device 103, or camera device 103 communicatively coupled with the underlying program 100. In some embodiments, the digital overlay application is concurrently running with the underlying network conferencing program 100. In some embodiments, the digital overlay screen 112 is configured such that its field(s) 220 and its controls supplant over the controls of the underlying recording device or network conferencing program 100. For example, a user can use a mouse or touch to navigate, open and close a field 220 in the application 101 and control the scrolling functions thereof without manipulation of the image capturing device's 103 or underlying running program's 103 controls.

However, users may also have the option to customize font, font size, and font color of content 240 within the fields 220, including the size and shape of them, as they desire. Fields 220 may also be customized to appear on the display overlay screen 112 for a fixed or transitory period, and/or, shift position, automatically/manually, either as a function of a pre-set timer, clock, or in response to a cue recognized by the application 101, such as a voice command.

The application 101 comprises an interface element comprising a voice-analyzing algorithm configured to determine and analyze speech, so as to adjust parameter controls in accordance with the user's speech or presentation. Speed and text parameters of the fields 220 and content 240 therein may enable the user to lock/unlock, open/close, or scroll/leave static the display of the fields/boxes 220, and content 240 therein.

Moreover, different fields or boxes 220 may be configured with different parameters. For example, a user may log into the digital overlay application 101, create an event 200 and upload one field 220 of content 240 comprising scrolling functions and three fields 220 static in position. Additionally, the speech and text parameters may be pre-set at a desired pace (like a teleprompter) so as to initiate the scrolling function for a field 220 comprising a script for a speech once the user begins a speech or live presentation. The speech and text parameters may also be set to optionally respond to cues, instructions, and/or input from the user as a control signal. Speech and text parameters may be configured to function at variable rates depending on the content 240 and its construction, such as font and font size, and speed if manually pre-determined. Specifically, the speed and text parameters may manually prompt the digital overlay application 101 to initiate a process change on the user interface 115, though in other embodiments the changes may be triggered without user input (i.e., automatically on behalf of the user). More specifically, the speech and text parameters may stop the scrolling function of a particular field 220 based on a timer elapsing, an interaction with the user interface 115 indicating an instruction to stop scrolling, latency or no audio being detected, or the user going off script by way of recognizing the voice has departed from the pre-set speech so the speech pauses. Audio, haptic, and/or visual feedback can also be used to inform the user that the performance has departed from the pre-set speech rate. Visual guidance can be displayed to the user using one or more colors, texts, images, or a combination thereof. In some embodiments, the accessibility and control functions may be customizable and set by the user. Note that the location of logic and storage can be combined, separated, or even sub-divided in different embodiments.

When a user has created the requisite content for an event 200, the user has the option to set a desired start time so that the digital overlay screen 112 opens automatically when the video event 200 is set to begin. A user may also indicate to the digital overlay application 101 when an event 200 will occur so that its processor 109 is able to auto-open a digital overlay screen 112 at the set schedule of an event 200. The user may also create the event 200 so that it opens at the time when underlying network conferencing platform or program 100 is opened. In this instance, the digital overlay screen 112 for the event 200 is tethered so as to open over the video window of said platform or program 100. Alternatively, the digital overlay application 101 can be opened manually whenever the underlying platform 100 is opened and sized as the user desires over the underlying platform 100.

Moreover, as illustrated in FIG. 10, the digital overlay screen 112 is configured to tether to the camera display of whatever optically active device 103, camera device, or network conferencing platform 100 is being used so that the camera-default field of view has the digital overlay field 220 over it. The field(s) 220 may be pre-populated so as to be displayed in a pre-set location on the field of view upon launch of the application 101 or underlying running program 100. Additionally or alternatively, the user may customize and save placement of the fields 220 so as to arrange script and boxes 220 in a desired location on the digital overlay screen 112 for display therein when an event occurs at a later time. In one embodiment, the digital overlay application 101 may position fields 220 on the digital overlay screen 112 so as to yield a line of sight of a user corresponding to the field of view of the camera device 103 or video program 100. In some embodiments, the digital overlay screen 112 is arranged such that it at least partially overlays the underlying video feed 120 and is positioned within the user interface 115 such that the user appears to maintain eye contact with a camera 103, or the like. The displayed elements on the user interface 115 may be arranged differently than the arrangements described or shown herein.

In another embodiment, the application 101 may recommend specific digital overlay screen 112 and field 220 positioning a line of sight of a user corresponding to the field of view of the tethered device or program 100 so as to assist the presenter in maintaining an optimized viewpoint. For example, a script within a field 220 may be displayed in a position near the presenter's camera 103 so the speaker appears to be speaking into the camera 103 as they read the field 220 of scripted content 240 (e.g., speech, argument, presentation notes, etc.).

In yet another embodiment, the digital overlay application 101 may dynamically update the digital overlay screen 112 and arrangement of the fields 220 based on the user's current line of sight so that the user does not appear to divert their eyes away from the camera's 103 primary line of sight. For example, the digital overlay application 101 may comprise eye analyzing algorithms configured to monitor and detect eye gaze and movement, such that the position of the digital overlay screen 112 and its fields 220 may be adjusted to compensate for shift in eye contact so as to create the visual perception to the audience that the user is looking directly into the camera 103, or at the audience itself, although they are reading from content 240 visually displayed on the digital overlay screen 112. In an exemplar embodiment, the application 101 interfaces with the optically active device's 103 (e.g., the camera) field of view such that if the eye positioning of a presenter appears angled to the right, the digital overlay screen 112 may shift to the left relative to its initial placement so that the user can reference or review the field content 240 during an event 200 without appearing to have disrupted eye contact with the audience (e.g., students, coworkers, a judge or jury, etc.). This allows the user or presenter to comfortably reference notes in the fields 220 and/or communicate in real-time with third parties through the chat interface or fields 220 during an event 200, all while seeming or appearing to maintain eye contact with a main focal point of the tethered device or program 100. The digital overlay screen 112 is configured such that the user may view the content 240 in the fields 220 while concurrently viewing the video feed 120 and interacting with the audience. The digital overlay screen 112 can be transparent and displayed simultaneously with the video feed 120. In this way, the digital overlay screen 112 does not significantly block the background image of the video feed 120. The video feed 120 may comprise imagery data captured and outputted from the camera 103 of the presenter's user device 110 during the rendering of a presentation.

Other eye detection, functionality, or AI algorithms determined by those skilled in the art may also be necessary for maintaining a central focal point with a tethered device or program 100. For example, a presenter utilizing AR glasses, wherein the digital AR overlay screen 112 is displayed thereon, may need to navigate the fields' content 240 using eye tracking parameters specific to the AR glasses technology. In an exemplar embodiment, a user may be utilizing an optically active device 103 which utilizes a gadget or neural implant, such as Neuralink. In this instance, functionality algorithms developed for the gadget may be integrated with the digital overlay application 101 so as to allow the user to maneuver content 240 in the digital overlay screen 112 displayed thereon in a manner native to said gadget or device. For example, a near invisible thimble device placed on a user's fingers, that when touched, may be configured to access and engage functions (e.g., play, stop, go left, etc., similar to a computer mouse).

Both the digital event 200 itself and the content 240 thereof, including but not limited to the rendering of the video feed 120 and chat messages exchanged in the fields 220, can be locally recorded (within a storage module of the application 101 or stored in an event-files database), in a remote data storage that is accessible to the digital overlay application 101, or a combination thereof. This enables, among other things, replay and history analysis by not only the user but also associates so as to better refine and revise content 240 as needed. This also allows the user to rehearse an event 200 and finalize actual content 240 to be placed for use in a digital overlay screen 112.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly to one another, or via one or more intermediary channels or devices. Devices may also be coupled in such a way that information can be passed there between, while not sharing any physical connection with one another. Additionally, the words "herein," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for some of the terms discussed herein. Although synonyms for certain terms may be provided, special significance is not to be placed on whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

When the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

As used herein and in the appended claims, the singular forms "a," "an," and "the" include plural referents unless the context clearly dictates otherwise.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Terminology

In the foregoing specification, the subject matter has been described with reference to specific embodiments thereof. It will, however, be evident that various modifications and changes may be made thereto without departing from the broader spirit and scope of the subject matter. For example, the reader is to understand that the specific ordering and combination of process actions described herein is merely illustrative, and the subject matter may appropriately be performed using different or additional process actions, or a different combination or ordering of process actions. For example, this subject matter is particularly suited for video conferencing systems; however, the subject matter can be used for any optically active system in general. Additionally and obviously, features may be added or subtracted as desired. Accordingly, the subject matter is not to be restricted except in light of the attached claims and their equivalents.

The invention claimed is:

1. A digital overlay system comprising:
a user device in communication with a network conferencing program, the user device comprising at least one processor coupled with a memory, wherein the user device is configured to output a first user interface;
a video feed captured by an image capturing device and configured to be displayed on the first user interface; and
an application stored on the user device that, when executed by the at least one processor, causes the at least one processor to generate a digital overlay screen, wherein the digital overlay screen is configured to be displayed on the first user interface and at least partially superimpose the video feed; and
wherein the image capturing device comprises a camera display configured to capture the video feed, wherein the digital overlay screen is further configured to tether to the camera display to create an appearance in the video feed that a user is maintaining eye contact with the image capturing device while reading or viewing digital content displayed on the digital overlay screen.

2. A method for rendering a presentation with a digital overlay screen, the method comprising:
receiving, by a user device, a video feed from an image capturing device;
outputting to the user device, by at least one processor coupled with a memory storing and executing an application, a first user interface comprising the video feed and a digital overlay screen with digital content;
capturing, by a camera display of the image capturing device, the video feed; and
tethering the digital overlay screen to the camera display to create an appearance in the video feed that a user is maintaining eye contact with the image capturing device while reading or viewing the digital content, wherein the digital overlay screen is configured to be at least partially superimposed on the video feed.

3. The method of claim 2, wherein the one or more remote devices are communicatively coupled with a network conferencing program, wherein the application is further configured to interface with the network conferencing program, and outputting, by the network conferencing program, a second user interface comprising the video feed to each of the one or more remote devices.

4. The method of claim 3, wherein the digital content is configured to be read or viewed by the user during a presentation on the network conferencing program, wherein the digital content comprises interactive features, and wherein the digital content includes text, audio, images, documents, and uploaded files.

5. The method of claim 2, wherein the digital overlay screen comprises one or more fields having the digital content, wherein the one or more fields comprise documents or images in Portable Document Format, Microsoft Word format, Joint Photographic Experts Group, and Portable Graphics Format.

6. The method of claim 2, wherein the digital overlay screen comprises a chat interface configured to enable the user to receive and/or exchange messages in real-time with one or more associates.

7. The method of claim 2, wherein the digital overlay screen comprises one or more fields having the digital content, wherein the one or more fields and the digital content are near translucent or transparent, and wherein the one or more fields and the digital content appear on the digital overlay screen without distorting the underlying video feed.

8. The digital overlay system of claim 1, further comprising one or more remote devices in communication with the network conferencing program, wherein the application is further configured to interface with the network conferencing program.

9. The digital overlay system of claim 8, wherein the network conferencing program is communicatively coupled with a network conferencing program, wherein the network conferencing program is configured to output a second user interface comprising the video feed to each of the one or more remote devices.

10. The digital overlay system of claim 1, wherein the digital overlay screen comprises one or more fields comprising the digital content configured to be read or viewed by the user during a presentation on the network conferencing platform.

11. The digital overlay system of claim 1, wherein the application, when executed by the at least one processor, causes the at least one processor to update the arrangement of the digital overlay screen based on the user's current line of sight so that the user does not appear to divert their eyes away from a primary line of sight of the image capturing device.

12. The digital overlay system of claim 1, wherein the digital overlay screen comprises one or more fields comprising digital content with interactive features, wherein the digital content comprises one or more of a text, an audio, images, documents, and uploaded files.

13. The digital overlay system of claim 12, wherein the one or more fields comprises documents or images, and wherein the digital content is generated based on one or more inputs, wherein the one or more inputs comprise digital content uploaded, downloaded, transmitted, inputted, or generated by the user or an associate.

14. The digital overlay system of claim 1, wherein the digital overlay screen comprises a chat interface, wherein the chat interface is configured to enable the user to receive and/or exchange messages in real-time with one or more associates.

15. The digital overlay system of claim 1, wherein the digital overlay system comprises backend services, such as, machine learning and artificial learning algorithms configured to analyze various types of data collected from the application.

16. The method of claim 2, further comprising:
analyzing, by backend services, such as machine learning and artificial learning algorithms, various types of data collected from the application.

* * * * *